UNITED STATES PATENT OFFICE.

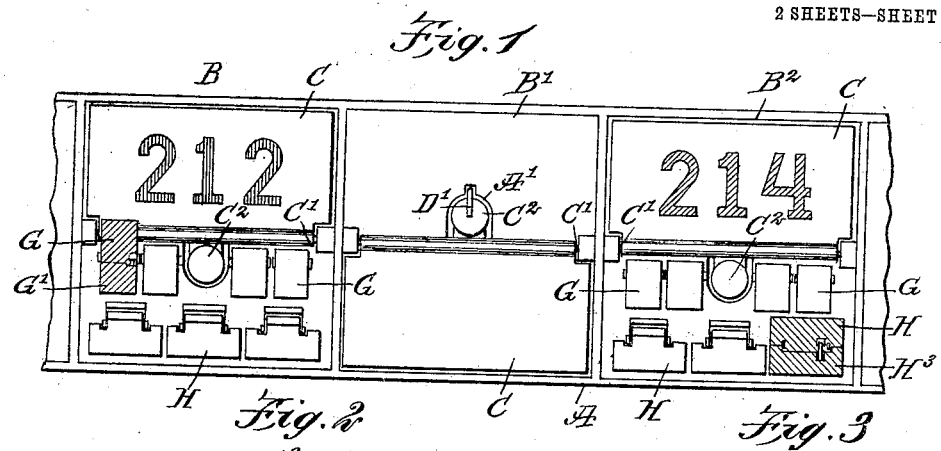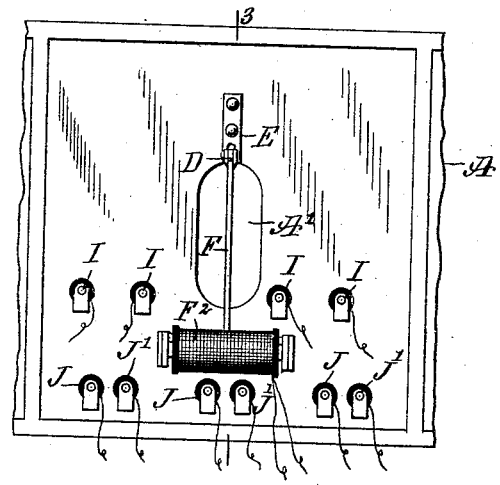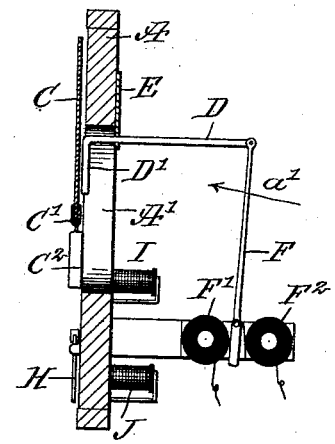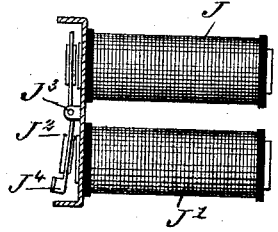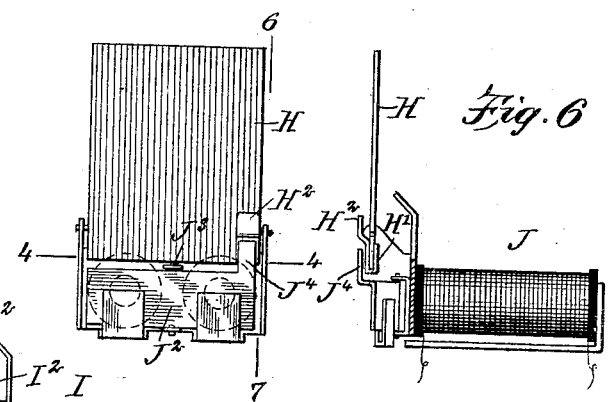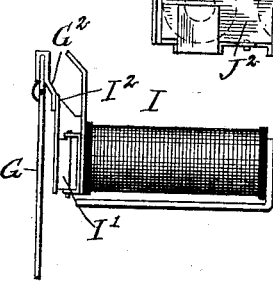

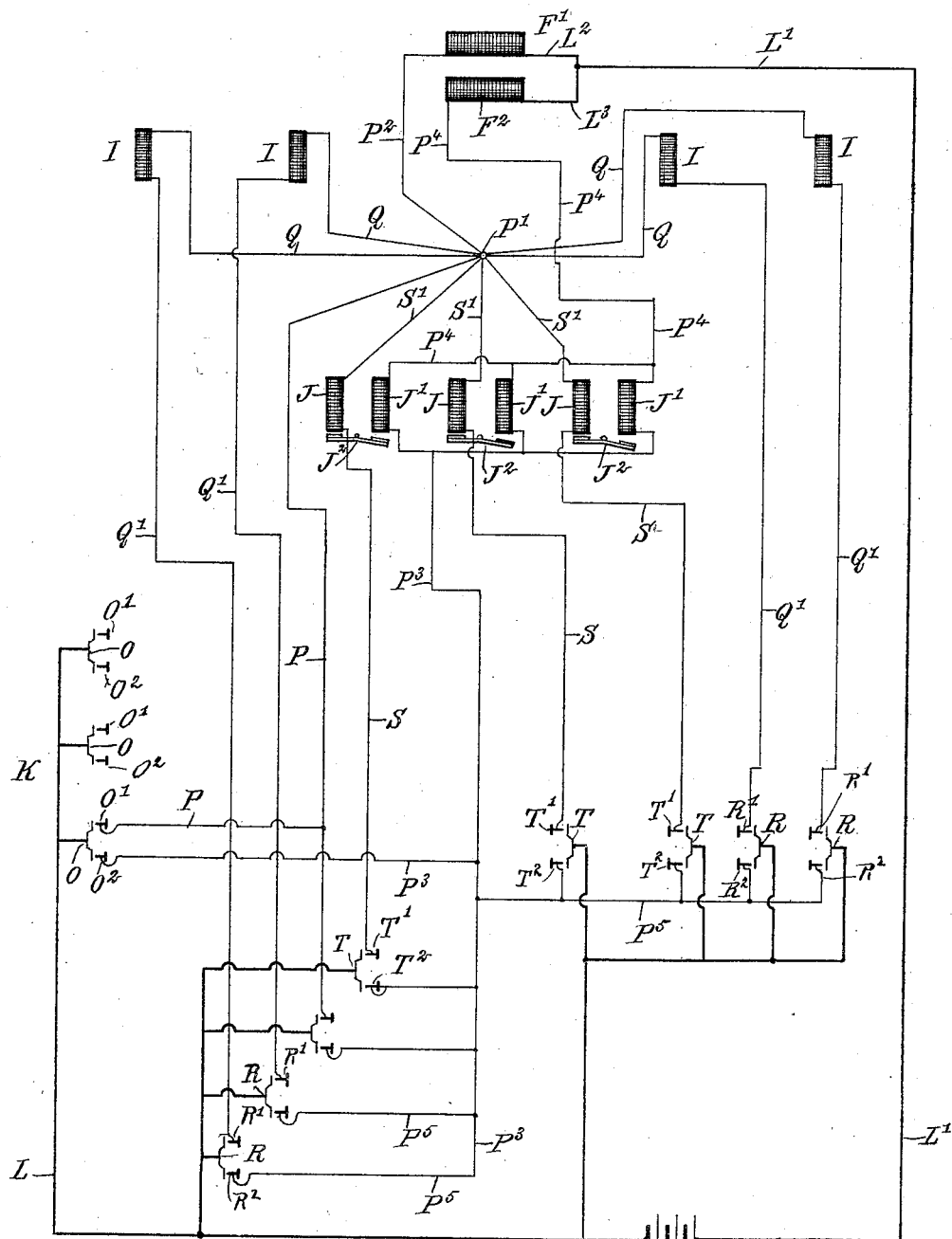

RUDOLF EINBIGLER, OF NEW YORK, N. Y.

VISUAL-SIGNAL APPARATUS.

940,444.

Specification of Letters Patent. Patented Nov. 16, 1909.

Application filed April 8, 1909. Serial No. 488,617.

*To all whom it may concern:*

Be it known that I, RUDOLF EINBIGLER, a citizen of the United States, and a resident of the city of New York, borough of Manhattan, in the county and State of New York, have invented a new and Improved Visual-Signal Apparatus, of which the following is a full, clear, and exact description.

The invention relates to visual signal apparatus, such as shown and described in the Letters Patent of the United States, No. 632,106, granted to me August 29, 1899.

The object of the invention is to provide a new and improved visual signal apparatus, designed for use in stock exchanges, factories, business houses and other mercantile establishments, and arranged for summoning a person to a meeting place by displaying the person's name, number or other indicating character, and also a station or a place to which the person is directed for meeting the caller.

For the purpose mentioned, use is made of an annunciator board, on which are arranged calling units, each of which consists of a name plate bearing the person's name or other indicating character, and a plurality of station or place plates, all electrically controlled from a distant point in such a manner that the name plate and one of the station or place plates are displayed simultaneously.

A practical embodiment of the invention is represented in the accompanying drawings forming a part of this specification, in which similar characters of reference indicate corresponding parts in all the views.

Figure 1 is a face view of the annunciator board provided with a plurality of calling units; Fig. 2 is a rear face view of the same and showing the electro-magnetic mechanism for one calling unit; Fig. 3 is a cross section of the same on the line 3—3 of Fig. 2; Fig. 4 is an enlarged sectional plan view of one of the place annunciators actuated by two electro-magnets, the section being on the line 4—4 of Fig. 5; Fig. 5 is a face view of the same; Fig. 6 is a transverse section of the same on the line 6—6 of Fig. 5; Fig. 7 is a transverse section of one of the place annunciators actuated by a single electromagnet; and Fig. 8 is a diagrammatic view of the improvement On the annunciator board A are arranged calling units B, B', B², one for each person or member liable to be called from a distant point, each unit being provided with a name plate C pivoted at C' at the middle of the annunciator board A so that the name plate C can swing down into a closed position, as shown at the unit B' in Fig. 1, or upward into a display position, as illustrated at the units B and B² in Fig. 1. The name plate C is provided on its displaying face with the name, numeral or other indicating character for the person to be called, for instance, as shown in Fig 1, the name plates bear consecutive numerals, one for each person or member. Thus, as shown in Fig. 1, the members, designated by the numbers 212 and 214, are called from remote points, as hereinafter more fully explained.

In order to swing the name plate C of each unit either into the down or up position, the following arrangement is made: A rod D having an angular end D' is mounted to slide transversely in a suitable bearing E, arranged on the back of the annunciator board A, and the forward end of the rod D extends through an opening A' formed in the board A, so that the angular end D' is adapted to engage the back of the name plate C at the time the latter is in an up position, as indicated in Fig. 3. Now when a forward movement is given to the rod D, then the angular end D' pushes the name plate C so as to swing the name plate downward into a closed position, as indicated in Fig. 1. On the pivoted end of the name plate C is a weighted projection C² adapted to swing behind the angular end D' of the rod D and at the time the name plate C reaches a lowermost position, as indicated at the unit B' in Fig. 1. Now when the rod D is moved rearwardly, then the angular end D' exerts a pull on the projection C², so that an upward swinging movement is given to the name plate C, to display the same, it being understood that it requires but little power to swing the plate C upward, as the weighted projection C² aids the upward swinging movement of the plate after the weighted projection has been started by the angular end D' of the rod D.

In order to give the pushing and pulling movement to the rod D, the rear end thereof is pivotally connected with one end of an oscillating armature F, oscillating between two electro-magnets F', F², mounted on the rear of the annunciator board A. Now when the several parts are in the position shown in Fig. 3, and the electro-magnet F² is energized, then a swinging motion is given to the armature F in the direction of the arrow $a'$, to move the rod D forward, thus pushing the name plate C with a view to swing the same downward into a closing or a non-display position, as previously explained. When the electro-magnet F' is subsequently energized, then the armature lever F is caused to swing in the inverse direction of the arrow $a'$, so that the rod D is drawn rearward, and in doing so acts on the weighted projection $C^2$, to swing the name plate C upward into a display position as before stated.

In the lower half of each calling unit and adjacent to the pivot of the name plate C are arranged a plurality of station or place plates G, below which are arranged a second set of station or place plates H, so that when the name plate C is swung down into a closed position both sets of station or place plates G and H are covered up, as indicated at the unit B' in Fig. 1. When, however, the name plate C is swung upward into display position, then the several place plates G and H are uncovered. Normally the station plates G and H are in a closed or non-display position, and each is pivoted on the annunciator board A and when swung upward display a certain color or other indicating character, representing a distant station or a place to which the person called is to go to meet the caller.

Each of the station plates G has its pivotal end adjacent to the pivotal end of the name plate C, and each station plate G is adapted to be swung into an upward position by the action of an electro-magnet I, so that the station plate G overlies the lower portion of the name plate C, as plainly indicated to the left of the unit B in Fig. 1. When the name plate C is swung downward this displayed station plate G is carried along by the name plate C, and is thus swung back into a closed position. As shown in Fig. 7, the single electro-magnet I is provided with a pivoted armature I' having an arm $I^2$ adapted to engage a projection $G^2$ on the pivotal end of the plate G at the time the plate G is closed. Now when the electro-magnet I is energized and its armature I' is attracted, then the arm $I^2$ pushes on the projection $G^2$ to swing the plate G upward into display position. The pivotal end of the plate G is weighted or counterbalanced to readily move the plate into final display position and to hold it therein until the name plate C is swung downward and returns the place plate G. Each station plate G when closed covers up a space G' of a corresponding color on the annunciator board A, so as to increase the station indicating character and thereby render the station more easily readable at the time the plate G is swung up into display position.

The station plates H are swung up and down by two electro-magnets J and J' arranged on the rear of the annunciator board A and controlling an armature $J^2$ pivoted at its middle at $J^3$. On one end of the armature $J^2$ is arranged an arm $J^4$ adapted to engage a projection H' on the pivotal end of the station plate H, to swing the plate H downward whenever the electro-magnet J' is energized. On the station plate H is also formed a second projection $H^2$, adapted to abut against the arm $J^4$ at the time the plate H is in a lowermost position, so that when the other magnet J is energized the arm $J^4$ pushes on the projection $H^2$ to swing the plate H into an upward or display position, as before explained (see the unit $B^2$). Each plate H when closed covers an area $H^3$ on the annunciator board A, and which area or space is colored corresponding to that of the plate H.

The electric connections for each unit B, B', $B^2$ are such that when the electro-magnet F' is energized for swinging the name plate C into an up or display position, then at the same time one of the station plates G or H is likewise swung into an upward position by the corresponding electro-magnet I or J being energized, and consequently the unit indicates the member and the station at which the member is to meet the caller.

For the purpose mentioned, the following arrangement is made, special reference being had to Fig. 8: A main key board K is connected by a main line wire L with a battery or other source of electrical energy N, from which leads a wire L' connected by branch wires $L^2$ and $L^3$ with the opening and closing electro-magnets F, and $F^2$ of the corresponding unit on the annunciator board A. On the main key board K are arranged sets of double contacts O and a pair of push buttons O', $O^2$ for the same, one set for each calling unit on the annunciator board A. Each contact O is connected with the main line wire L, and the push button O' is connected by a wire P with a central point P', from which leads a wire $P^2$ to the opening electro-magnet F'. The push button $O^2$ is connected by a wire $P^3$ with the closing magnets J' of the corresponding unit, the said closing magnets being connected by a wire $P^4$ with the closing electro-magnet $F^2$. Thus when the push button O' is pressed, the main circuit is closed and the opening magnet F' is energized, to swing the corresponding name plate C into open or display position, thus giving notice to the corresponding member that his presence is desired at the main office in which the key board K is located. When the other push button $O^2$ is pressed then the closing circuit is closed, so that the closing electro-magnet $F^2$ is energized to swing the name plate C back into closing position. It is understood that the push buttons O', O² are released immediately after they have made connection with their double contact O so that the electro-magnets are deënergized immediately after the name plate is swung into open or closed position. Each of the single magnets I is connected by a wire Q with the central point P' and consequently with the opening electro-magnet F', and the said electro-magnets I are also connected by wires Q' with the push buttons R' of sets of double contacts R and pairs of push buttons R', R², similar to the sets of contacts O and push buttons O', O² but located at different stations. The push buttons R² are connected by return wires P⁵ with the closing wire P³, previously mentioned, and connected with the closing electro-magnets J' and F², and the double contacts R are connected with the main line wire L. Thus when one of the buttons R' is pressed to close the circuit for the corresponding wire Q', then the corresponding opening electro-magnets I and F' are actuated simultaneously, to swing both the name plate C and the corresponding station plate G up into display position, and when the other push button R² is pressed the circuit for the return wire P⁵ is closed and the electro-magnet is energized, and consequently the name plate C is swung downward, and in doing so carries along the previously opened station plate G. The opening magnets J are connected by wires S with the push button T' of sets of double contacts T and push buttons T', T² located at different stations, and the said magnets are also connected by wires S' with the common point P' and hence with the opening magnet F'. The push buttons T² are connected with the return wires P⁵, P³ connected with the closing electro-magnets J' and F², and the contacts T are connected with the main line wire L. Now when a push button T' is pressed, the corresponding circuit for the wire S is closed and the corresponding electro-magnet J and the electro-magnet F' are energized to swing the name plate C and the corresponding station plate H into open position, and when the other push button T² is pressed the circuit for the return wire P³ is closed and the corresponding electro-magnet J' and the electro-magnet F² are energized, to swing the name plate C and the corresponding station plate H back into a closed position.

Having thus described my invention, I claim as new and desire to secure by Letters Patent:

1. A visual signal apparatus, comprising an annunciator board provided with annunciator units one for a person, each unit having a name plate, different station plates, electro-mechanisms for actuating the said plates, and controlling circuits from different sections leading to each unit, each controlling circuit containing the electro-mechanism for the said name annunciator plate and the electro-mechanism for one of the said station annunciator plates.

2. A visual signal apparatus, comprising a name plate mounted to swing, electro-magnets for controlling the said name plate, a station plate mounted to swing, an electro-magnet for operating the same, and a controlling circuit for both sets of electro-magnets to actuate both plates simultaneously from one station.

3. A visual signal apparatus, comprising an annunciator board provided with annunciator units, each unit having a name plate, different station plates normally hidden by the said name plate, electro-magnetic mechanisms for the said plates of each unit, and controlling circuits for each unit, each controlling circuit containing the electro-magnetic mechanism for the said name plate and the electro-magnetic mechanism for one of the said station plates.

4. A visual signal apparatus, comprising an annunciator board provided with annunciator units, each having a pivoted name plate, a plurality of pivoted station plates normally covered up by the said name plate, electro-magnetic mechanisms, one for swinging the said name plate upward into display position and the other for swinging the name plate downward into closing position, an electro-magnetic mechanism for each of the said station plates to swing the same upward into display position, and a plurality of controlling circuits, each containing the electro-magnetic mechanism for the said name plate and the electro-magnetic mechanism for one of the said station plates.

5. A visual signal apparatus, comprising an annunciator board provided with annunciator units, each having a pivoted name plate, a plurality of pivoted station plates normally covered up by the said name plate, electro-magnetic mechanisms, one for swinging the said name plate upward into display position and the other for swinging the name plate downward into closing position, and electro-magnetic mechanism for each of the said station plates to swing the same upward into display position and against the face of the said name plate, the latter on closing swinging the station plates downward into closing position, and a plurality of controlling circuits, each containing the electro-magnetic mechanism for the said name plate and the electro-magnetic mechanism for one of the said station plates.

6. A visual signal apparatus, comprising an annunciator board provided with annunciator units, each having a pivoted name plate, a plurality of pivoted station plates normally covered up by the said name plate, electro-magnetic mechanisms, one for swinging the said name plate upward into display position and the other for swinging the name plate downward into closing position, an electro-magnetic mechanism for each of the said station plates to swing the same upward into display position and downward into a closing position, and a plurality of controlling circuits, each containing the electro-magnetic mechanism for the said name plate and the electro-magnetic mechanism for one of the said station plates.

7. A visual signal apparatus provided with an annunciator plate mounted to swing and having a projection at the pivoted end of the said plate, a double electro-magnet, and a single armature for both electro-magnets and oscillating between them, and having an arm adapted to engage the said plate and its projection, to push the plate into one position and to pull the plate into the other position.

In testimony whereof I have signed my name to this specification in the presence of two subscribing witnesses.

RUDOLF EINBIGLER.

Witnesses:
   THEO. G. HOSTER,
   PHILIP D. ROLLHAUS.